United States Patent [19]

Mull

[11] 4,027,525

[45] June 7, 1977

[54] METHOD AND APPARATUS FOR DETERMINING THE RELATIVE ROUGHNESS OF HOLES IN REFRACTORY COMPOSITIONS

[75] Inventor: Richard T. Mull, Augusta, Ga.

[73] Assignee: Great Lakes Carbon Corporation, New York, N.Y.

[22] Filed: May 21, 1975

[21] Appl. No.: 579,493

[52] U.S. Cl. .................................. 73/37; 73/37.9
[51] Int. Cl.² ...................................... G01M 13/00
[58] Field of Search ............ 73/37, 37.8, 37.9, 211

[56] References Cited

UNITED STATES PATENTS

| | | | |
|---|---|---|---|
| 2,417,988 | 3/1947 | Mooney | 73/37 |
| 3,178,931 | 4/1965 | Kirk | 73/37.9 X |
| 3,508,432 | 4/1970 | Marshall, Jr. et al. | 73/37.8 |
| 3,838,599 | 10/1974 | Purtell | 73/211 |

FOREIGN PATENTS OR APPLICATIONS

| | | | |
|---|---|---|---|
| 313,854 | 9/1971 | U.S.S.R. | 73/37.5 |

Primary Examiner—Jerry W. Myracle
Assistant Examiner—John S. Appleman
Attorney, Agent, or Firm—Carl F. Peters

[57] ABSTRACT

Method and apparatus for determining the machinability and/or the friction factor and relative roughness of holes in solid bodies, particularly of holes in bodies of refractory composition, such as of graphite, are described.

One objective in the design and processing of graphite, such as is used in a nuclear reactor core, is the optimization of the pressure drop through the coolant channels or holes in said core. In many instances, frictional head losses provide the chief contribution to a given pressure drop. Among other objectives, the present invention is designed to permit ready measurement as to when optimization of pressure drop through such holes has been achieved, and to thereby also indirectly provide a means or monitoring device for ascertaining the best drilling parameters and/or processing conditions to be used in producing said graphite core.

4 Claims, 3 Drawing Figures

METHOD AND APPARATUS FOR DETERMINING THE RELATIVE ROUGHNESS OF HOLES IN REFRACTORY COMPOSITIONS

BACKGROUND OF THE INVENTION

1. Field of the Invention

The invention relates to a means and/or method for determining the machinability of refractories and/or non-destructively ascertaining, measuring, and evaluating characteristics of the inside surface finish of conduits or drilled holes in solid bodies, such as in said graphite cores. The invention also relates to a means and/or method for determining frictional pressure losses of a gas flowing through these conduits or drilled holes. The invention further relates to the optimization of the production, machining and processing of graphite cores for nuclear reactors.

2. Description of the Prior Art

A surface texture measurement technique is described in ASA B 46.1 published by the ASME in 1962. In general, in this technique a stylus tracer head traverses a given sampling length to give attenuation-compensated microinch readouts. The reference also defines such terms as surface roughness, waviness, and lay; as well as describing the stylus-type instruments which are employed in measuring those quantities. As "an optimization" technique, however, the surface texture measurement technique described in this reference is not considered at all comparable or competitive with the friction factor testing apparatus and method of the present invention. Problems of this published technique include: the stylus wearing away thhe measured surface; poor reproducibility; ambiguous extrapolation to flow and pressure effects; only partial inside diameter (I.D.) surface measurement; and inaccessability of the surface to measurement. Stated another way, the friction factor testing technique of the present invention in a non-destructive test (NDT), whereas the ASME method is a destructive test when applied to holes bored in solid bodies such as of graphite.

SUMMARY OF THE INVENTION

One of the principal objectives of the present invention in the optimization of helium (or other fluid) coolant flow parameters in graphite cores of High Temperature Gas Cooled Reactors (HTGRs) by best choice of graphite grade, and machining conditions such s drill speed and drill feed-rate, thereby achieving:

1. Optimization (e.g., minimization) of flow distortions in coolant holes of HTGRs;
2. Optimization (e.g., minimization) of pressure drops across coolant holes of HTGRs;
3. Reduction of local stresses around fuel and coolant holes due to the lessening of thermal gradients; and
4. If fuel technology ever develops to the point where the graphite temperatures, rather than the fuel temperatures, limit the reactor operating temperature, than also increasing the magnitude of mechanical and flow distribution engineering hot spot safety margins through the use of the "friction factor tester" of this invention.

Accomplishment of a second objective of this invention, i.e. the:

Definition of the surface finish on the inside diameter (I.D.) of holes in graphite through a mathematical quantity which is proportional to the surface texture (i.e., surface roughness, waviness, and lay).

Other objectives, which are interrelated with the accomplishment of the first two objectives are the:

Definintion of the "machinability" of various grades of refractories, particularly graphite according to the graphite formulation and/or its manner of processing, keyed to particle size and coherence; and measurement of "particle pull-out" which occurs with certain types of graphite and/or as a result of certain machhining parameters such as drill feed rate, drill speed and "chip load". (Chip load is defined as the drill speed in revolutions per minute (RPM) divided by the drill feed rate in inches per minute).

Determination of the internal surface finish of a conduit or hole in any solid body and/or refractory composition by the measurement of the frictional resistance of that conduit or hole to the flow of a gas and by comparing said frictional resistance to that for conduits or holes of the same internal diameter and length, for which holes the surface characteristics have already been defined or are known.

As indicated, an objective in the design of a nuclear reactor graphite core is the optimization of the pressure drop through the coolant channels. In many instances, frictional head losses provide the main contribution to a given pressure drop. This pressure drop may be ascertained from measurements and calculations involving the following equation (I):

$$PD = F (L/D) R V^2/2g \quad (I)$$

Where

PD = frictional pressure drop ($lbf/ft^2$)
L = length of flow channel (ft)
D = equivalent diameter of the flow channel (the actual diameter of circular holes) (ft)
F* = dimensionless friction factor
* For convenience, the symbol "F" is used in this specification to identify the friction factor instead of the usual $f$.
R = density of the flowing coolant fluid at operating temperature ($lbm/ft^3$)
V = coolant speed or fluid velocity (ft/sec)
g = conversion factor (acceleration of gravity) $4.17 \times 10^8$ ($lbm.ft/lbf.hr$)

From equation (I) note that optimizing (e.g., maximizing or minimizing) the pressure drop in a reactor core requires the determination and subsequent optimization of the friction factor F.

Equation I can be solved for "F" to give equation (II):

$$F = (D/L) (PD/R) (2g/V^2)$$

Using the apparatus of the present invention, determining the friiction factor is a straightforward testing procedure. Compressed air with sufficiently high Reynolds number to induce turbulent flow (shop air will typically suffice) is injected at velocity V through a coolant hole drilled in the graphite block. Pressure and velocity readings are taken both at entrance ($P_1$, $V_1$) and exit ($P_2$, $V_2$). The diameter to length ratio is constant for any given coolant hole.

The pressure drop (PD) is simply the difference between the pressure at entrance and exit, i.e. $P_1-P_2$. Note: Mean velocities and pressures are used in these equations.)

Initially a value of F is quantified or determined for a given length and diameter hole. for "fully rough" turbulent flow, all that is necessary to determine how much pressure drop this hole would exhibit in actual reactor use is to insert F into equation (I), along with R, the density of the coolant fluid, and V, both of which are readily attainable reactor design parameters. This procedure can be applied to individually blocks and then to stacked blocks to measure by a difference method the pressure-drop effect of leakage along the face of mating coolant holes in adjoining graphite blocks.

The rougher the surface finish, the lower the Reynolds number (Re) that will be required to achieve turbulent flow. Once "fully rough" turbulent flow is achieved, F becomes independent of Re. In this region of fully developed flow, F will become a constant. This constant provides a single-valued measure of the surface finish of the I.D. of a hole drilled in a graphite block. Through this measure, the optimizations and definitions described under the foregoing set forth objectives can be achieved. Furthermore, so long as Re indicates tubulent flow, relative values of F can be obtained for optimization purposes without necessarily attaining the higher Re region where F becomes independent of Re. Which approach yields better results depends upon available instrumentation, as well as upon the degree of turbulence (i.e., the Re value) achieved by the helium or coolant fluid in the HTGR core. The main advantage of operating where F is independent of Re lies in the fact that it is not necessary to duplicate the Re which occurs in the HTGR core in order to provide a value of F directly interchangeable between air testing and HTGR helium.

The mass flow rate used in the operation of a high temperature gas cooled nuclear reactor is such as to yield a Reynolds number (Re) between 50,000 and 100,000, where the Reynolds number is defined as $$Re = (DVR)/U$$

$V =$ fluid velocity (ft/sec)
$=$ density of the flowing fluid (1bm/ft$^3$)
$U =$ absolute viscosity of the fluid coolant (sec/1bmft)

The device employed in the present invention and hereinafter described was designed and constructed so as to operate in the same Reynolds number range so as to closely simulate actual conditionsused in the reactor.

BRIEF DESCRIPTION OF THE DRAWINGS

The invention will be better understood by reference to the drawings presented herewith wherein.

DETAILED DESCRIPTION OF THE DRAWINGS

Figure 1:
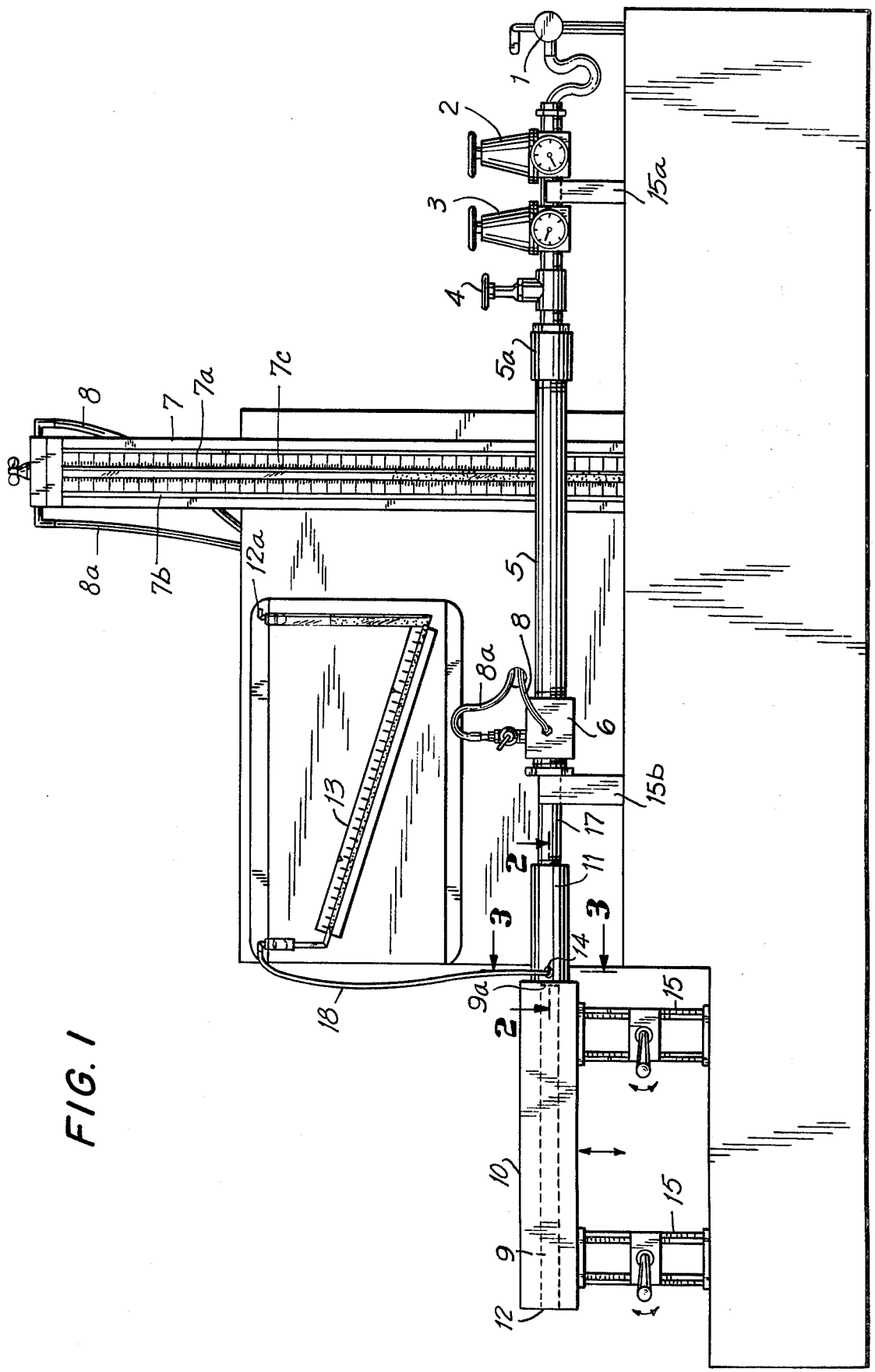
FIG. 1 is a schematic view of the apparatus employed to carry out the friction factor or frictional resistance testing procedure of the present invention.

In FIG. 1, air (such as "shop air") or other gas from a suitable source, is introduced into the apparatus at 1. Pressure regulators 2 and 3 and valve 4 serve to set the pressure at the desired level and to guard against or minimize undesirable fluctuations in same. The gas then goes through a smoothly, internally bored conduit 5, typically via a threaded coupling member 5a, into a standard type velocity orifice plate holer 6 which plate is necessary in order to measure the air flow rate, i.e. the volume of air that flows through the apparatus in a given length of time, e.g. cubic feet per hour. Manometer 7, by means of fluid columns 7a and 7b and indicator 7c and tubing 8 and 8a measures the initial pressure of the gas which is led into velocity orifice plate holder 6 and into the hole 9 (at 9a) of the extended solid body piece 10 being tested. (Solid body piece 10 is positioned and maintained in a horizontal position by means of jacks 15 or other suitable leveling means. Similar or equivalent support and/or leveling means 15a and 15b are also employed elsewhere, such as indicated, to maintain the apparatus in an aligned horizontal position). This "initial pressure" is substantially the same at the inlet adapter 11 and at the entrance 9a to the hole 9 in the solid body under test, but is measurably different from "exhaust pressure" of the gas which leaves the hole 9 in the solid body, at 12. This "differential pressure" or "pressure drop" between the initial pressure and the exhaust pressure is measured by means of the "slant tube" or inclined manometer 13 which measures the initial pressure by being coupled to the inlet adapter 11 at 14, and also the exhaust pressure at 12a by being open to the atmosphere, the same as is the hole in the solid body, at 12.

Figure 2:
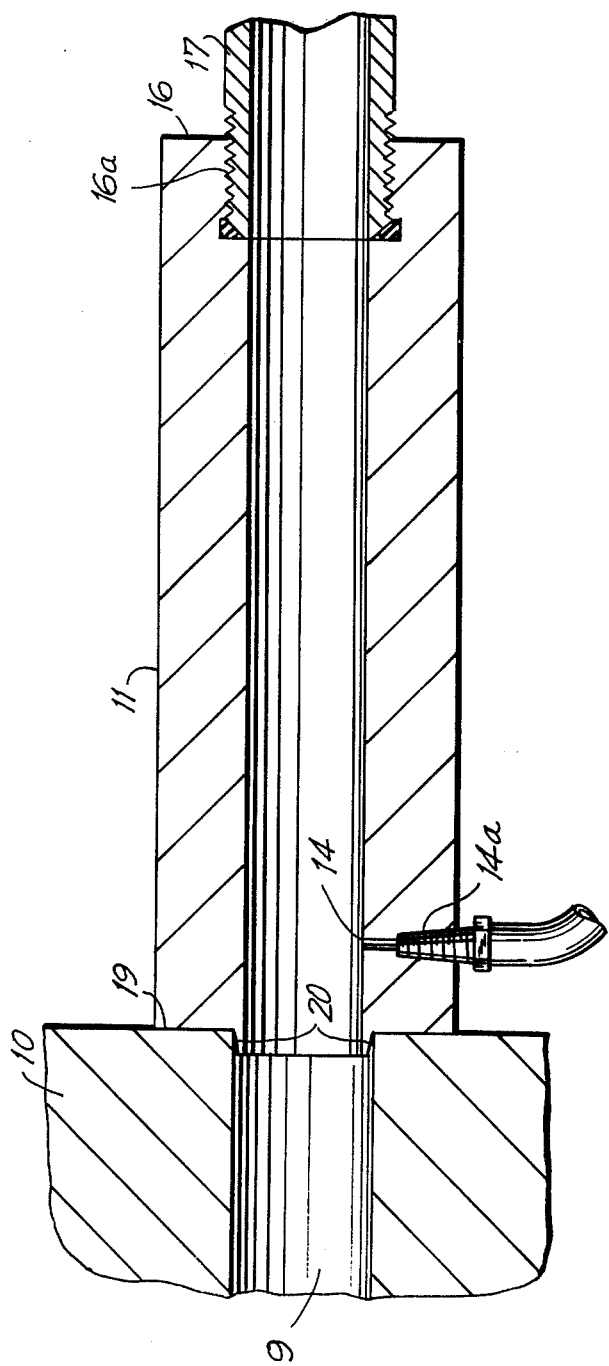
FIG. 2 is primarily a cross-sectional view taken along lines 2—2 of FIG. 1, of an inlet adapter of a design which is particularly suitable for introducing a gas or fluid into and through the hole or holes in the solid body under test with a minimum of pressure loss.

As shown in FIG. 2, and as previously indicated, the inlet adapter 11 is designed so as to comprise a smooth, internally bored conduit for the gas and to introduce it into and/or through the hole 9 in the solid body 10 with a minimum of pressure loss.

It should be noted that the apparatus may exhaust to the atmosphere, as shown in FIG. 1, or alternatively and preferably, it may be so constructed as to utilize two such adapters 11 as illustrated in FIG. 2, one at each end of the hole in the solid body being tested, so as to eliminate expansion losses and provide for a more accurate measurement of the pressure drop.

With reference once more to the inlet adapter 11 of FIG. 2, it is necessary that this adapter be so designed and constructed that it can be connected directly or indirectly to the orifice plate holder 6 and the solid body piece 10 in such a way that it can introduce the pressurized gas into the hole of the solid body with a minimum of loss of pressure and with a minimum introduction of any turbulence.

Figure 3:
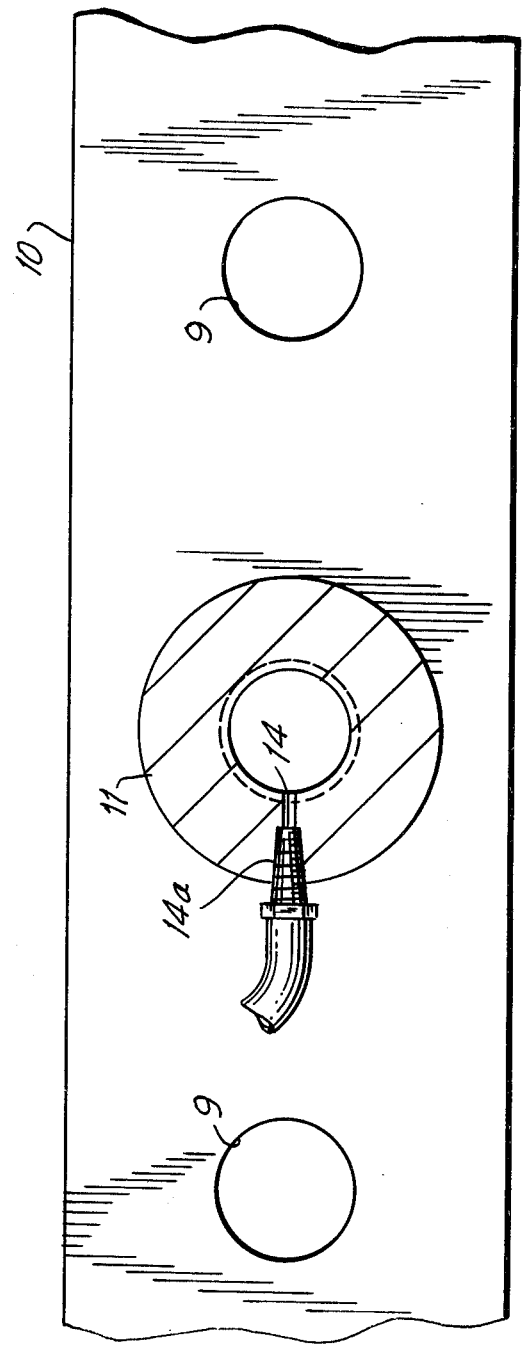
FIG. 3 is a cross-sectional view, taken along lines 3—3 of FIG. 1. This figure is particularly intended to show the ready insertability and withdrawability of the inlet adapter into and from a solid body having a number of holes therein of the same internal diameter.

Preferably, and as indicated in FIGS. 1 and 2, the adapter 11 is so constructed that its inlet end 16 is internally threaded at 16a so as to be threadably engaged to externally threaded gas tight conduit means 17 leading from orifice plate holder 6. Like conduit means 5, conduit means 17 is also smoothly, internally bored so as to introduce or cause minimal pressure drop and/or turbulence of the gas flowing through same. Tubing 18 from slant tube 13 is coupled at 14 to the adapter 11 near its exit end by means of a threaded valve engaged in threaded opening 14a. The exit end 19 of adapter 11 has a tapered flange 20 at its end which is so dimensioned as to be press-fitted (with minimal loss of pressure) into the opening 9a in the hole 9 of the solid body piece 10 which is to be tested for pressure-drop acros same. This design permits the ready and efficient insertability and withdrawability of the inlet adapted into and from a solid body having a number of holes of the same internal diameter (such as illustrated in FIG. 3) simultaneously with a minimum loss of pressure as each individual hole is tested for its relative frictional resistance or internal surface finish. For turbulent flow (high Reynolds numbers) it has been found that the friction factors for flow of a gas or fluid through a pipe increases as the relative roughness on the inside surface of the pipe increases. Hence by measuring the friction factor for air flowing through the coolant holes in Nuclear graphite blocks one can determine the relative roughness of the inside surface of the hole. Because this is possible, then both drill speed and material can be optimized to produce the most economically acceptable machined block. In order to determine the friction factor one simply has to measure the pressure drop of air through the block at a given flow rate using the experimental set-up shown schematically in FIG. 1.

EXAMPLES

Friction factors were determined for holes using six different drill feed rates in four graphite blocks of different grades and with three different air flow rates. These experimental variables are listed below:

| Drill Feed Rates (In Order of Increasing Rates) | Graphite Grades | Air Flow Rates |
|---|---|---|
| (Slowest Rate) | A — coarse mix A.D. 1.68 | 1100 CFH |
| | B — Less Coarse Mix A.D. 1.69 | 1600 CFH |
| | C — Fine Mix A.D. 1.74 | 2000 CFH |
| (Fastest Rate) | D — Fine Mix A.D. 1.76 | |

TABLE I

FRICTION FACTORS - Graphite Grade A

| Air Flow Rate (CF/H) | DRILL FEED RATES | | | | | |
|---|---|---|---|---|---|---|
| | 1 | 2 | 3 | 4 | 5 | 6 |
| 1100 | .0298 | .0313 | .0316 | .0328 | .0324 | .0341 |
| 1600 | .0275 | .0292 | .0304 | .0317 | .0311 | .0330 |
| 2000 | .0267 | .0286 | .0301 | .0313 | .0311 | .0327 |

TABLE II

FRICTION FACTORS - Graphite Grade B

| Air Flow Rate (CF/H) | DRILL FEED RATES | | | | | |
|---|---|---|---|---|---|---|
| | 1 | 2 | 3 | 4 | 5 | 6 |
| 1100 | .0277 | .0285 | .0294 | .0298 | .0300 | .0292 |
| 1600 | .0248 | .0262 | .0274 | .0276 | .0278 | .0269 |
| 2000 | .0234 | .0251 | .0260 | .0267 | .0268 | .0260 |

TABLE III

FRICTION FACTORS - Graphite Grade C

| Air Flow Rate (CF/H) | DRILL FEED RATES | | | | | |
|---|---|---|---|---|---|---|
| | 1 | 2 | 3 | 4 | 5 | 6 |
| 1100 | .0275 | .0281 | .0288 | .0290 | .0288 | .0292 |
| 1600 | .0245 | .0255 | .0260 | .0264 | .0262 | .0267 |

TABLE III-continued

FRICTION FACTORS - Graphite Grade C

| Air Flow Rate (CF/H) | DRILL FEED RATES | | | | | |
|---|---|---|---|---|---|---|
| | 1 | 2 | 3 | 4 | 5 | 6 |
| 2000 | .0231 | .0240 | .0250 | .0253 | .0249 | .0255 |

TABLE IV

FRICTION FACTORS - Graphite Grade D

| Air Flow Rate (CF/H) | DRILL FEED RATES | | | | | |
|---|---|---|---|---|---|---|
| | 1 | 2 | 3 | 4 | 5 | 6 |
| 1100 | .0275 | .0279 | .0279 | .0288 | .0290 | .0292 |
| 1600 | .0245 | .0249 | .0252 | .0260 | .0266 | .0267 |
| 2000 | .0230 | .0234 | .0241 | .0250 | .0255 | .0258 |

It can be seen that with few exceptions, for all three air flow rates employed, the measured and calculated friction factor increased as the drill feed rate was increased, indicating that the roughness of the inside machined surface also increases as the drill feed rate is increased. The correlation is good in all cases and indicates that the friction factor tester of the present invention is sensitive enough to detect the different drill feed rates and also their influence on the friction factor.

It is also interesting to note that the approximate straight line correlation of friction factor to drill feed rates was better for the Grade C and D materials than it was for the coarser Grade A and B materials. This observation connotes a difference in machinability of the materials. The higher density, fine grain materials C and D produce smoother machined surfaces than do the lower density, coarser grain A and B materials.

The difference in the machinability of these materials can be shown by plotting the measured friction factor at an air flow rate of 2000 CFH against the material density. There is a big drop in friction factor from the Grade A material to the Grade B material and smaller drop from the Grade B material to the Grade C and D materials. There is no noticeable difference in machinability between the latter grade materials. This correlation of friction factor to density is not linear. Actually the decrease in friction factor from the Grade B material to the Grade D material is small while the increase in apparent density is quite large. Since these materials were all equally graphitized, the noticeable difference in machinability can be correlated better to grain size than to density.

The relative roughness of the inside surface of the drilled holes is related to the measured friction factors. For a given relative surface roughness, the friction factor decreases as the Reynolds number (flow rate) increases. However, for fully developed turbulent flow in semi-rough conduits or pipes, the friction factor becomes independent of the Reynolds number and correlates directly with the relative surface roughness. Hence, to measure relative surface roughness directly, it is helpful to operate the apparatus at a Reynolds number high enough to produce a direct correlation of surface roughness to friction factor.

In summary, it can be seen that the Friction Factor Tester of the present invention can be effectively used to determine nondestructively the friction factor and the relative roughness of the inside surface of conduits or holes in solid bodies particularly of refractory type bodies, such as of the drilled holes in graphite reactor blocks. It may also be used to determine the effects of machining parameters such as drill feed rate or chip load on the friction factor and relative roughness of the these drilled holes. Furthermore, the "Friction Factor Tester" may be effectively used to evaluate the machinability of differently processed or formulated or of different grades of graphite. Finally, the Tester can provide an accurate measure that would be experienced for the pressure drop of the fluid coolant through a graphite reactor block. This can be very useful to the designers of the gas cooled reactors because this pressure drop directly affects the design efficiency of the reactor.

I claim:

1. An apparatus for determining the frictional resistance to a flow of gas through an internal passage extending through a solid body of extended length which comprises:
   a source of gas at shop pressure;
   a gas tight fluid circuit connected between said source and the inlet to said passage operative to provide a flow of predetermined characteristics through said passage to the atmosphere including:
       a three stage pressure regulating means including a first pressure regulator connected to said source, a second pressure regulator connected to the outlet of said first pressure regulator and a valve connected to the outlet of said second pressure regulator, said pressure regulators and said valve cooperating to minimize undesireable pressure fluctuation from said source;
       a velocity orifice plate in fluid communication with said pressure regulating means and downstream thereof for maintaining a flow rate in said circuit of sufficiennt quantity to provide a fully developed turbulent flow in said circuit downstream of said velocity orifice plate;
       first and second pressure sensing means connected into said circuit at said velocity plate inlet and outlet respectively and adapted to provide measurements of the flow pressure at said plate inlet and outlet;
       an inlet adapter in said circuit for transporting said flow from said orifice plate outlet to said passage substantially without further pressure drop, said adapter partially insertable by press fitting in said passage;
   means for measuring the pressure drop of said flow through said passage from the passage inlet to the atmosphere and thereby determining the frictional resistance to said flow through said passage.

2. The apparatus of claim 1 wherein said passage has a generally circular cross section and a length substantially greater than its diameter.

3. The apparatus of claim 1 wherein said solid body is made of graphite.

4. The apparatus of claim 1 wherein said fluid is adapted to provide a flow through said passage having a Reynolds number of between approximately 50,000 and 100,000.

* * * * *

UNITED STATES PATENT OFFICE
CERTIFICATE OF CORRECTION

Patent No. 4,027,525              Dated June 7, 1977

Inventor(s) Richard T. Mull

It is certified that error appears in the above-identified patent and that said Letters Patent are hereby corrected as shown below:

| | |
|---|---|
| Column 1, line 34 | Change "thhe" to -the- |
| Column 1, line 61 | Change "than" to -then- |
| Column 1, line 65 | After the first "of" add -the foregoing principal objective is made possible through the accomplishment of- |
| Column 2, line 5 | Change "definintion" to -definition- |
| Column 2, line 10 | Change "machhining" to -machining- |
| Column 2, line 56 | Change "friiction" to -friction- |
| Column 2, line 66 | Change "pressure" to -pressures- |
| Column 3, line 2 | After the period, "for" should be capitalized |
| Column 3, line 8 | Change "individually" to -individual- |
| Column 3, after line 40 | Line omitted, -D = diameter of flow channel (ft)- |
| Column 3, line 43 | -R- omitted |
| Column 3, line 49 | Space necessary between "conditions" and "used" |
| Column 4, line 12 | Change "holer" to -holder- |
| Column 4, line 29 | -the- omitted before "exhaust" |

UNITED STATES PATENT OFFICE
CERTIFICATE OF CORRECTION

Patent No. 4,027,525      Dated June 7, 1977

Inventor(s) Richard T. Mull

It is certified that error appears in the above-identified patent and that said Letters Patent are hereby corrected as shown below:

| | |
|---|---|
| Column 5, line 6 | Change "acros" to –across– |
| Column 5, line 8 | Change "adapted" to –adapter– |
| Column 5, in Examples | Before Table I, sentence omitted, –The Friction obtained from these variables are presented in the following Tables– |
| Column 6, line 63 | Change "effectiely" to –effectively– |
| Column 8, line 4 | Change "sufficiennt" to –sufficient– |

Signed and Sealed this

Fourth Day of October 1977

[SEAL]

Attest:

RUTH C. MASON
Attesting Officer

LUTRELLE F. PARKER
Acting Commissioner of Patents and Trademarks